(12) United States Patent
Shan et al.

(10) Patent No.: US 9,686,645 B2
(45) Date of Patent: Jun. 20, 2017

(54) LOCATION INFORMATION SHARING METHOD AND APPARATUS

(71) Applicant: TENCENT TECHNOLOGY (SHENZHEN) COMPANY LIMITED, Shenzhen (CN)

(72) Inventors: Yi Shan, Shenzhen (CN); Jun Wang, Shenzhen (CN); Pinlin Chen, Shenzhen (CN); Dacheng Zhuo, Shenzhen (CN); Liang Wu, Shenzhen (CN); Ling Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/168,296

(22) Filed: May 31, 2016

(65) Prior Publication Data

US 2016/0277885 A1 Sep. 22, 2016

Related U.S. Application Data

(63) Continuation of application No. PCT/CN2015/071239, filed on Jan. 21, 2015.

(30) Foreign Application Priority Data

Jan. 24, 2014 (CN) .......................... 2014 1 0036818

(51) Int. Cl.
*H04W 24/00* (2009.01)
*H04W 4/02* (2009.01)
*H04W 76/02* (2009.01)

(52) U.S. Cl.
CPC ............. *H04W 4/02* (2013.01); *H04W 4/028* (2013.01); *H04W 76/02* (2013.01)

(58) Field of Classification Search
CPC ....... H04W 4/02; H04W 4/028; H04W 76/02; H04W 4/013; H04W 4/04; H04W 4/023;
(Continued)

(56) References Cited

U.S. PATENT DOCUMENTS

| 6,885,874 B2 * | 4/2005 | Grube | H04W 84/08 455/404.2 |
| 2006/0064346 A1 * | 3/2006 | Steenstra | G06Q 30/0261 705/14.64 |

(Continued)

FOREIGN PATENT DOCUMENTS

| CN | 101159915 A | 4/2008 |
| CN | 102984654 A | 3/2013 |

(Continued)

OTHER PUBLICATIONS

The World Intellectual Property Organization (WIPO) International Search Report for PCT/CN2015/071239 Apr. 13, 2015.

*Primary Examiner* — Mahendra Patel
(74) *Attorney, Agent, or Firm* — Anova Law Group, PLLC

(57) ABSTRACT

The present disclosure discloses a location information sharing method. The method includes: initiating by a first terminal a location sharing session; waiting for a second terminal to join the location sharing session; receiving previous location information of the second terminal after the second terminal joins the location sharing session, and displaying the previous location of the second terminal that is marked by using the previous location information of the second terminal; receiving current location information of a second terminal; updating on the location display area of the first terminal, the previous location of the second terminal that is marked by using previous location information of the second terminal to a current location of the second terminal that is marked by using the current location information; and displaying on the location display area of the first terminal a voice communication interface for providing voice communication simultaneously within the location sharing session.

20 Claims, 8 Drawing Sheets

(58) Field of Classification Search
CPC ............ G06Q 30/0259; G06Q 30/0261; H04L 67/10; H03W 76/02
USPC ......................................................... 455/457
See application file for complete search history.

(56) References Cited

U.S. PATENT DOCUMENTS

| | | | |
|---|---|---|---|
| 2007/0124789 A1* | 5/2007 | Sachson | G06Q 30/00 725/117 |
| 2007/0219708 A1* | 9/2007 | Brasche | G01C 21/32 701/457 |
| 2009/0254840 A1* | 10/2009 | Churchill | G06F 3/0481 715/753 |
| 2013/0073473 A1* | 3/2013 | Heath | G06Q 30/02 705/319 |
| 2013/0130726 A1* | 5/2013 | Deng | H04M 1/72572 455/457 |
| 2014/0141811 A1* | 5/2014 | Kawazoe | G06Q 30/0259 455/456.3 |

FOREIGN PATENT DOCUMENTS

| | | |
|---|---|---|
| CN | 103036953 A | 4/2013 |
| JP | 5276746 B1 | 8/2013 |

* cited by examiner

Pressing a microphone button to initiate speaking

Getting ready

When extended status pane is shown, the user's own icon has a highlighted frame

Speaking

A circle appears around the microphone button and changes diameter as the recording volume varies When another person is speaking

LOCATION INFORMATION SHARING METHOD AND APPARATUS

CROSS REFERENCE TO RELATED APPLICATIONS

This application is a continuation application of PCT application PCT/CN2015/071239, filed on Jan. 21, 2015, which claims the priority benefit of Chinese Patent Application No. 201410036818.9, entitled "LOCATION INFORMATION SHARING METHOD AND APPARATUS", filed on Jan. 24, 2014, the content of both of which is incorporated by reference herein in its entirety.

TECHNICAL FIELD

The present disclosure relates to a location information sharing method and apparatus.

BACKGROUND

Using mobile terminals to implement instant messaging between users has become a commonly used communications means, and increasingly more developers start to pay attention to applications on the mobile terminals. Currently, many users usually need to share their locations with their friends when communicating with their friends. However, by means of traditional geographical location sharing, only static geographical locations, such as static maps showing current locations, can be shared with the friends, while location changes and moving directions of the users often cannot be shared, thereby failing to acquire dynamic locations of the users in real time. Moreover, according to the present disclosure, what can be learned by means of the traditional geographical location sharing is only limited to locations of friends who are performing communication, but the users cannot have conversations with the friends at the same time when viewing the locations of the friends, and accordingly cannot learn the locations of the friends at the same time when having conversations with the friends.

SUMMARY

According to one aspect of the embodiments of the present disclosure, a location information sharing method is provided, which includes: initiating, by a first terminal, a location sharing session; waiting, by the first terminal, for a second terminal to join the location sharing session; receiving, by the first terminal, previous location information of the second terminal after the second terminal joins the location sharing session, and displaying, on a location display area of the first terminal, the previous location of the second terminal that is marked by using the previous location information of the second terminal; receiving, by a first terminal, current location information of a second terminal; updating, by the first terminal and on the location display area of the first terminal, the previous location of the second terminal that is marked by using previous location information of the second terminal to a current location of the second terminal that is marked by using the current location information, wherein the previous location information is received by the first terminal before receiving the current location information; and displaying, by the first terminal, on the location display area of the first terminal a voice communication interface for providing voice communication simultaneously within the location sharing session.

According to another aspect of the embodiments of the present disclosure, a location information sharing apparatus is further provided, which is located on a first terminal and includes: a receiving unit, configured to receive current location information of a second terminal; an updating unit, configured to update, on a location display area of the first terminal, a previous location of the second terminal that is marked by using previous location information of the second terminal to a current location of the second terminal that is marked by using the current location information, where the previous location information is received by the first terminal before receiving the current location information; an initiation unit, configured to initiate a location sharing session before the first terminal receives the current location information of the second terminal; a waiting unit, configured to wait for the second terminal to join the location sharing session; a first receiving unit, configured to receive the previous location information of the second terminal after the second terminal joins the location sharing session; and a first displaying unit, configured to display, on the location display area of the first terminal, the previous location of the second terminal that is marked by using the previous location information of the second terminal. The first terminal displays on the location display area of the first terminal a voice communication interface for providing voice communication simultaneously within the location sharing session.

Other aspects of the present disclosure can be understood by those skilled in the art in light of the description, the claims, and the drawings of the present disclosure.

BRIEF DESCRIPTION OF THE DRAWINGS

The accompanying drawings are included to provide a further understanding of the present disclosure, and constitute a part of this application. The exemplary embodiments and the illustrations of the present disclosure are only intended to explain the present disclosure, rather than to limit the present disclosure. In the accompanying drawings.

DESCRIPTION OF EMBODIMENTS

To make persons skilled in the art better understand the solution of the present disclosure, the technical solution of the present disclosure will be clearly and completely described in the following with reference to the accompanying drawings. It is obvious that the embodiments to be described are only a part rather than all of the embodiments of the present disclosure. All other embodiments obtained by persons of ordinary skill in the art based on the embodiments of the present disclosure without creative efforts shall fall within the protection scope of the present disclosure.

It should be noted that, in the specification, claims, and the foregoing accompanying drawings of the present disclosure, the terms "first", "second", and the like are used to distinguish similar objects, and are not necessarily used for describing a specific order or sequence. It should be understood that, the terms used in this manner can be interchanged, so that the embodiments of the present disclosure described herein can be implemented, for example, in other sequences than those shown or described herein. In addition, the terms "include", "contain" or any other variation thereof, are intended to cover a non-exclusive inclusion, for example, a process, a method, a system, a product or a device that includes a series of steps or units is not limited to including only those explicitly listed steps or units but may include other steps or units that are not explicitly listed, or inherent to the process, method, product, or device.

A terminal, as used herein, may refer to any appropriate user terminal with certain computing capabilities, such as a personal computer (PC), a work station computer, a hand-held computing device (tablet), a mobile terminal (a mobile phone or a smart phone), a smart terminal, or any other user-side computing device. A terminal may also include one or more processors to execute computer programs stored in memory of the terminal. A server, as used herein, may refer to one or more server computers configured to provide certain server functionalities. A server may also include one or more processors to execute computer programs stored in memory of the server.

Figure 1:
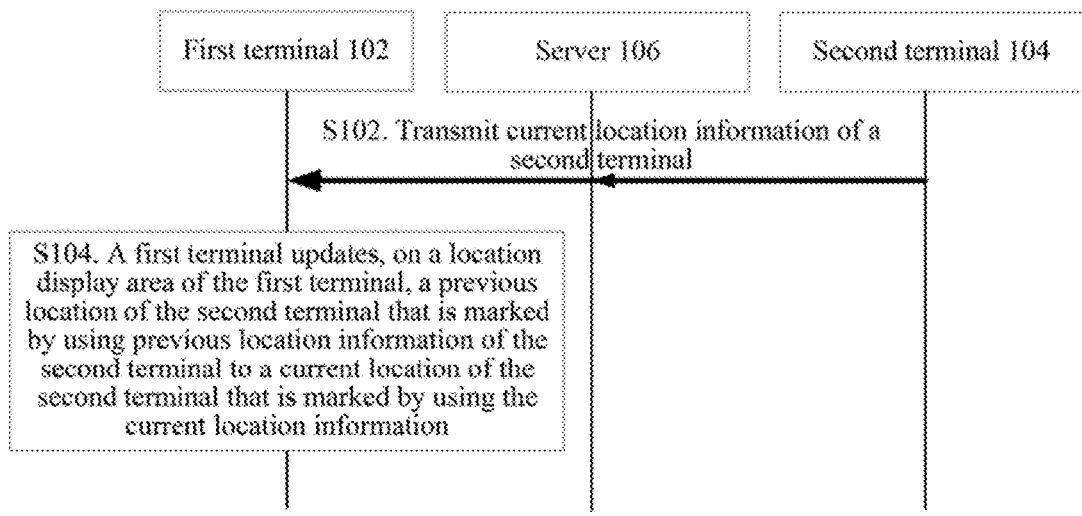
FIG. 1 is a flowchart of an optional location information sharing method according to an embodiment of the present disclosure.

FIG. 1 illustrates an exemplary location information sharing method. As shown in FIG. 1, the location information sharing method includes the following steps.

S102: A first terminal receives current location information of a second terminal.

Optionally, a first terminal 102 and a second terminal 104 may be members in a same location sharing session, where the session in this embodiment is a connection-oriented communications manner, and many users are allowed to participate in the session to simultaneously communicate with each other. Optionally, the current location information in this embodiment may include, but not limited to, at least one of the following: the longitude and latitude of a current location, a prominent building around the current location, and a moving direction showing a change of a terminal location.

Optionally, a current location of the second terminal is displayed on the first terminal 102 by using a marker on a map. Optionally, the first terminal 102 and the second terminal 104 in this embodiment may be mobile phones or tablet computers, which are only examples, and are not limited in this application.

Optionally, the foregoing scene may be applied to an instant messaging process, so that members who are communicating with each other can acquire location information of each other in real time. For example, when a location sharing session includes two member terminals: the first terminal 102 and the second terminal 104, the first terminal 102 receives current location information sent by the second terminal 104. The foregoing is only an example, and is not limited in this application.

Optionally, a condition of sending the current location information by the second terminal 104 includes at least one of the following: 1) the second terminal 104 sends updated location information to the first terminal after detecting a location change of the second terminal 104; and 2) the second terminal 104 actively sends current location information of the second terminal 104 after every pre-determined time period. Optionally, the current location information displayed on a location display area of the first terminal 102 may include at least one of the followings: picture information and text information.

Figure 4:
FIG. 4 is a schematic diagram of an optional location information window according to an embodiment of the present disclosure.
Figure 5:
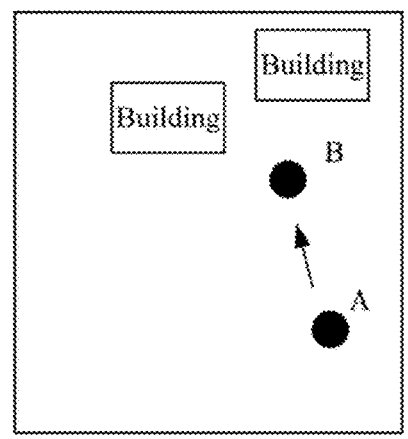
FIG. 5 is a schematic diagram showing optional sharing of location information according to an embodiment of the present disclosure.

For example, when the second terminal 104 detects a change in location information of the second terminal 104, for example, as shown in FIG. 5, when the second terminal 104 moves from a location A to a location B, location information of the location B is sent to the first terminal 102, where the sent location information includes: a moving direction from the location A to the location B, the longitude and latitude of the location B, and a prominent building around the location B. For ease of understanding, FIG. 5 only shows a relative location change of the second terminal 104, while FIG. 5 may further include map information, window information, button information, and the like that are shown in FIG. 4, which are not limited in this application.

S104: The first terminal updates, on a location display area of the first terminal, a previous location of the second terminal that is marked by using previous location information of the second terminal to a current location of the second terminal that is marked by using the current location information.

Optionally, the location display area may be a part or all of a display screen of the first terminal, and the previous location or the current location of the second terminal may be displayed on the location display area by using an application program running on the first terminal. FIG. 4 shows an optional example in which location information (for example, the previous location or the current location of the second terminal) is displayed on a location display area. As shown in FIG. 4, the location information is marked on map information, and a total of four (4) terminals are displayed over the map. In certain embodiments, in addition to the location information and the map information, corresponding window information, button information, and the like may further be displayed on the location display area, which are not limited in this embodiment.

Optionally, the previous location information is received by the first terminal before receiving the current location information.

Optionally, the location information displayed on the location display area of the first terminal 102 may include, but is not limited to, at least one of the following: location information of all members in a same location sharing session, and location information of members who meet pre-determined requirements in a same location sharing session, where the members who meet pre-determined requirements include a member who joins the session first and a member whose communication distance is less than a pre-determined threshold.

For example, if the previous location of the second terminal that is received by the first terminal 102 previously is a location A, and the current location of the second terminal 104 that is received by the first terminal 102 afterwards is a location B, the location A for identifying the location of the second terminal and displayed on the location display area of the first terminal 102 is updated to the location B.

Optionally, the location information transmitted in this embodiment may be, as shown in FIG. 1, processed by a server 106 and then continuously transmitted to all other terminals, or may also be directly transmitted by the second terminal to the first terminal. For example, as shown in FIG. 1, the location information of the second terminal 104 may be first sent to the server 106, and the server 106 processes the location information and then sends processed location information to the first terminal 102; or the second terminal 104 may also directly transmit the location information to the first terminal 102.

According to disclosed embodiments of this application, a first terminal receives current location information of a second terminal, and updates the current location information of the second terminal on a corresponding location display area of the first terminal, so that the first terminal can share dynamic location information of the second terminal in real time, and current location changes and moving directions of all members in a location sharing session can be acquired. In this way, dynamic location information of many users can be shared, thereby improving user experience according to user requirements.

Figure 2:
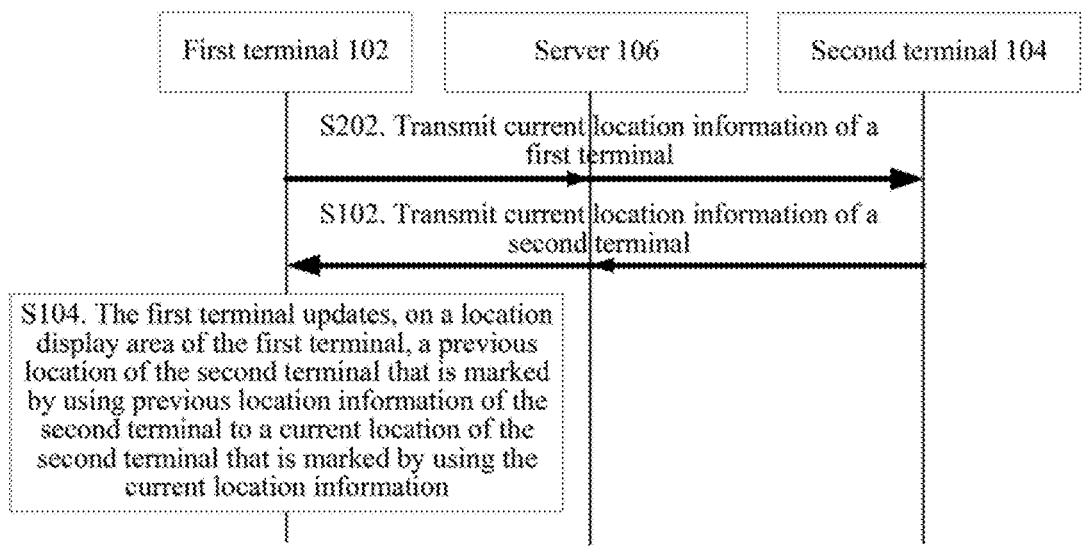
FIG. 2 is another flowchart of an optional location information sharing method according to an embodiment of the present disclosure.

Optionally, as shown in FIG. 2, the foregoing method further includes the following step(s).

S202: The first terminal sends current location information of the first terminal to the second terminal, so that the second terminal updates, on a location display area of the second terminal, a previous location of the first terminal that is marked by using previous location information of the first terminal to a current location of the first terminal that is marked by using the current location information of the first terminal, where the previous location information of the first terminal is received by the second terminal previously.

For example, the first terminal 102 may send current location information of the first terminal 102 to a server 106, and then the server 106 transmits the current location information to the second terminal 104. For example, if the first terminal 102 moves from a location C to a location D, the location C for identifying the location of the first terminal 102 is updated to the location D on the location display area of the second terminal 104.

According to the embodiment provided by this application, current location information of a first terminal is sent to a second terminal, so that current location information of the first terminal on the location display area of the second terminal is updated, and dynamically changed location information of members in a location sharing session can be shared.

Figure 3:
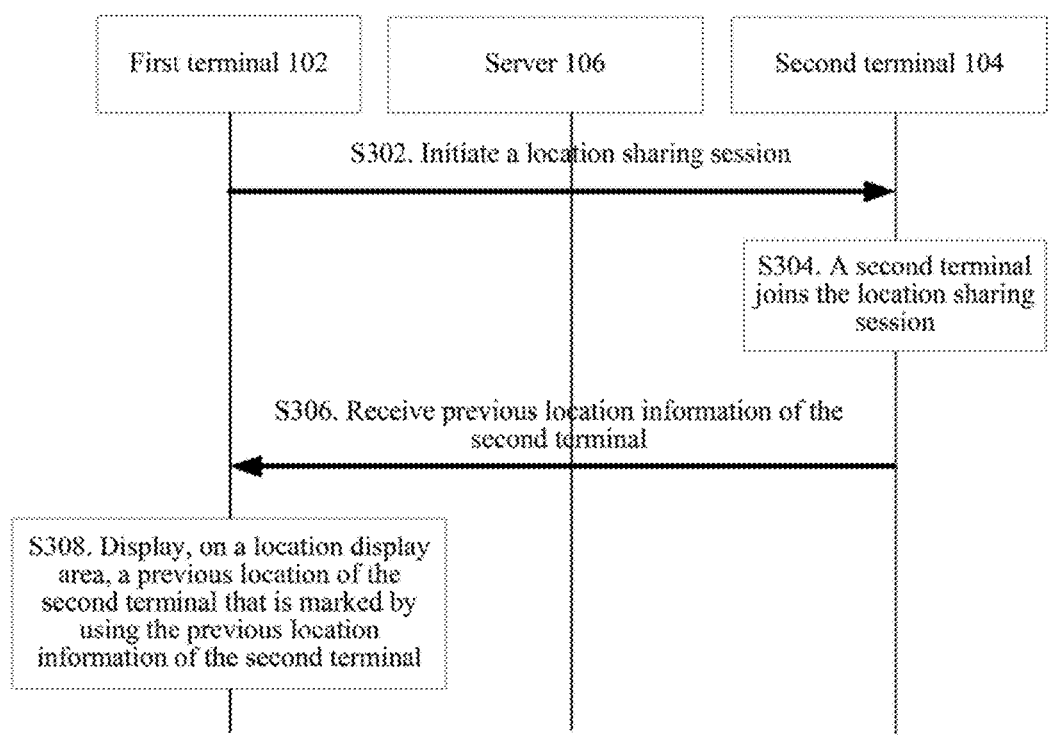
FIG. 3 is still another flowchart of an optional location information sharing method according to an embodiment of the present disclosure.

Optionally, as shown in FIG. 3, before the first terminal receives the current location information of the second terminal, the method further includes the following step(s).

S302: The first terminal initiates a location sharing session.

S304: The first terminal waits for the second terminal to join the location sharing session.

S306: The first terminal receives the previous location information of the second terminal after the second terminal joins the location sharing session.

5308: The first terminal displays, on a location display area of the first terminal, the previous location of the second terminal that is marked by using the previous location information of the second terminal.

Optionally, the foregoing scene is applied after the first terminal 102 initiates a location sharing session, and one or more terminals may be invited to participate in the session. Optionally, a method for displaying multiple terminals on the location display area of the first terminal 102 includes at least one of the following: displaying locations of all terminals in a same window; displaying the location of the first terminal 102 and a location of any invited terminal in a same window; displaying locations of terminals first participating in the session in a same window; and displaying locations of terminals whose communication distances are each less than a pre-determined threshold in a same window, where the communication distance being less than the pre-determined threshold may be for the terminals being in a same cell or a same city. The foregoing window may be shown in FIG. 4, and optionally, in foregoing different display manners, scaling of the map shown in the window is also different.

For example, the first terminal 102 actively initiates a location sharing session, invites the second terminal 104 to join the session, receives the previous location information of the second terminal 104 after the second terminal 104 joins the session, and marks the previous location of the second terminal 104 on the location display area of the first terminal 102 according to the previous location information.

According to the embodiment provided by this application, a first terminal actively initiates a location sharing session, and receives and displays previous location information of a second terminal joining the session, so that terminals included in a same location sharing session can share dynamic location information, and acquire locations of all members in the session in real time, thereby improving user experience of the communicating members.

Optionally, when the previous location of the second terminal that is marked by using the previous location information of the second terminal is displayed on the location display area of the first terminal, the method further includes the following step(s).

S1: Displaying a current location or a previous location of the first terminal on the location display area of the first terminal.

Optionally, the location display area may be a part or all of a display screen of the first terminal, and the previous location or the current location of the second terminal may be displayed on the location display area by using an application program running on the first terminal. FIG. 4 shows an optional example in which location information (for example, the previous location or the current location of the second terminal) is displayed on a location display area, and in FIG. 4, the location information is marked on map information. In this embodiment, besides the location information and the map information, corresponding window information, button information, and the like may further be displayed on the location display area.

For example, when a previous location A of the second terminal that is marked by using the previous location information of the second terminal 104 is displayed on the location display area of the first terminal 102, the current location or the previous location of the first terminal 102 may be further displayed on the location display area of the first terminal 102. For example, if the previous location of the first terminal 102 is C and the current location thereof is D, the previous location C or the current location D of the first terminal 102 is displayed on the location display area of the first terminal 102.

S2: Displaying the current location or the previous location of the first terminal and a current location or a previous location of a third terminal on another location display area of the first terminal different from the location display area of the first terminal, where the third terminal joins, in advance of the second terminal, the location sharing session initiated by the first terminal.

Optionally, the location display area of the first terminal 102 may include, but is not limited to, multiple windows.

Optionally, the first terminal 102, the second terminal 104, and the third terminal in this embodiment may be members in a same location sharing session.

Optionally, a method for displaying the first terminal 102, the second terminal 104, and the third terminal on the location display area of the first terminal 102 includes at least one of the following: displaying them in a same window; displaying the first terminal 102 and any invited terminal in a same window; displaying, in a same window, the first terminal and the third terminal that first participate in the session; and displaying, in a same window, the first terminal and the third terminal that are in the same city.

Figure 6:
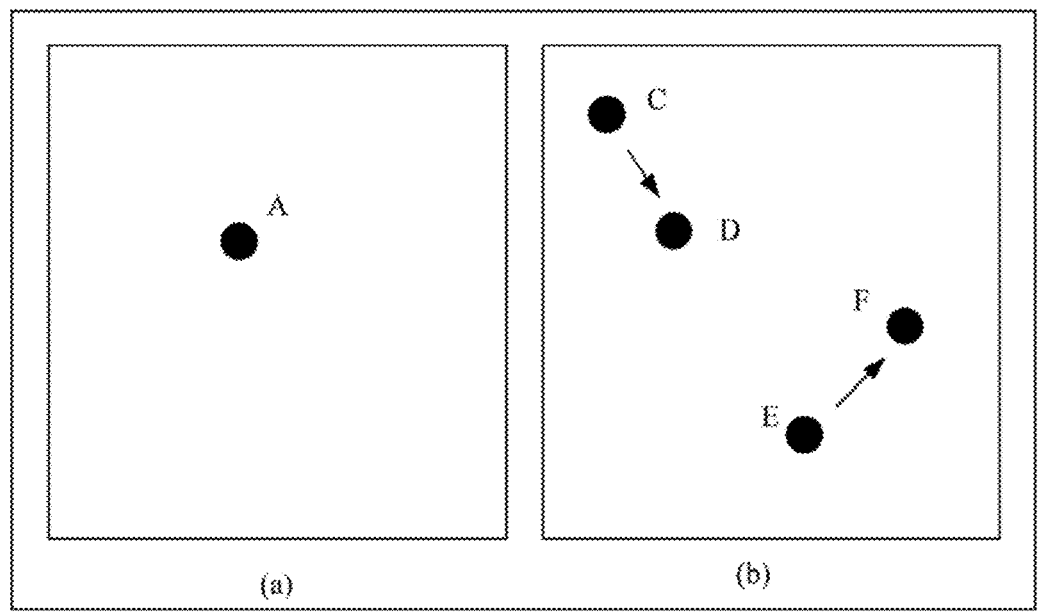
FIG. 6 is another schematic diagram showing optional sharing of location information according to an embodiment of the present disclosure.

For example, as shown in FIG. 6, when the first terminal 102 initiates a location sharing session, the first terminal 102 first invites the third terminal, and then invites the second terminal 104 to join the location sharing session. As shown in FIG. 6(*a*) and FIG. 6(*b*), when a previous location A of the second terminal 104 that is marked by using the previous location information of the second terminal 104 is displayed on the location display area of the first terminal 102, a previous location C or a current location D of the first terminal 102 and a previous location E or a current location F of the third terminal are displayed on another location display area of the first terminal 102 different from the location display area of the first terminal 102, such as in a window different from the window in which the second terminal 104 is displayed. The first terminal and the third terminal first participate in the session, and accordingly they are displayed in the same window, while the second terminal may be displayed in another window. For ease of understanding, FIG. 6 may further include map information, window information, button information, and the like that are shown in FIG. 4, which are not limited in this application.

According to the embodiment provided by this application, a first terminal and a third terminal that first participates in a session are displayed on a position different from a location display area of the second terminal, so that members who participate in the session afterwards does not affect normal communication and location information sharing between members who participate in the session previously.

Optionally, before the first terminal receives the current location information of the second terminal, the method further includes the following step(s).

S1: The first terminal joins a location sharing session initiated by the second terminal.

Optionally, in this embodiment, the foregoing scene is applied after the second terminal 104 actively initiates a location sharing session, and the first terminal 102 is invited to join the location sharing session. That is, the first terminal 102 joins the session as an invited session member.

S2: The first terminal receives the previous location information of the second terminal after joining the location sharing session, and displays, on the location display area of the first terminal, the previous location of the second terminal that is marked by using the previous location information of the second terminal.

Optionally, in this embodiment, the location display area may be a part or all of a display screen of the first terminal, and the previous location or the current location of the second terminal may be displayed on the location display area by using an application program running on the first terminal. FIG. 4 shows an optional example in which location information (for example, the previous location or the current location of the second terminal) is displayed on a location display area, and in FIG. 4, the location information is marked on map information. In this embodiment, besides the location information and the map information, corresponding window information, button information, and the like may further be displayed on the location display area, which are not limited in this embodiment.

Optionally, in this embodiment, the first terminal 102 accepts the invitation to participate in the location sharing session initiated by the second terminal 104. Optionally, a method for displaying the first terminal 102 on the location display area of the first terminal 102 includes, but is not limited to, at least one of the following: displaying locations of all terminals in a same window; displaying the location of the first terminal 102 and a location of any invited terminal in a same window; displaying locations of terminals first participating in the session in a same window; and displaying locations of terminals whose communication distances are each less than a pre-determined threshold in a same window, where the communication distance being less than the pre-determined threshold may be, but is not limited to, the terminals being in a same cell or a same city. The foregoing window may be shown in FIG. 4, and optionally, in foregoing different display manners, scaling of the map shown in the window is also different.

For example, after joining the location sharing session initiated by the second terminal 104, the first terminal 102 receives the previous location information of the second terminal 104, and displays, on the location display area of the first terminal 102, the previous location of the second terminal 104 that is marked by using the previous location information of the second terminal 104.

Optionally, when the previous location of the second terminal that is marked by using the previous location information of the second terminal is displayed on the location display area of the first terminal, the method further includes the following step(s).

S1: Displaying a current location or a previous location of the first terminal on the location display area of the first terminal.

Optionally, in this embodiment, not only the previous location of the second terminal 104 can be displayed on the location display area of the first terminal 102, the current location or the previous location of the first terminal 102 can also be displayed thereon. For example, if the previous location of the first terminal 102 is C and the current location thereof is D, the previous location C or the current location D of the first terminal 102 is displayed on the location display area of the first terminal 102.

Figure 7:
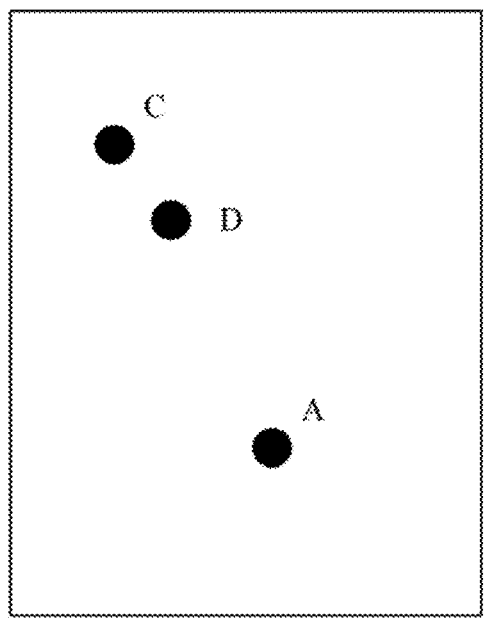
FIG. 7 is still another schematic diagram showing optional sharing of location information according to an embodiment of the present disclosure.

Further, as shown in FIG. 7, all terminals participating in the session may be displayed in a separated manner, that is, location information of all members who participate in the location sharing session is displayed on the location display area of the first terminal 102, such as the previous location of the second terminal 104, and the previous location or the current location of the first terminal 102. For ease of understanding, FIG. 7 may further include map information, window information, button information, and the like that are shown in FIG. 4, which are not limited in this application.

According to the embodiment provided by this application, a current location or a previous location of a first terminal is displayed on a location display area of the first terminal, so that a second terminal and the first terminal are displayed in a same window at the same time, and dynamic location information of members in a location sharing session can be shared.

Optionally, before or after the first terminal receives the current location information of the second terminal that is sent by the second terminal, the method further includes the following step(s).

S1: The first terminal receives and plays voice information sent by the second terminal.

Optionally, the first terminal 102 and the second terminal 104 in this embodiment may be members in a same location sharing session.

Optionally, in this embodiment, at the same time when a member (for example, the first terminal 102) in a same location sharing session implements location sharing, the member may further receive and play voice information sent by another member (for example, the second terminal 104).

Optionally, in this embodiment, the location sharing session includes a voice collection button, for example, a real-time recording state is entered after a user presses the voice collection button.

For example, when a location sharing session includes the first terminal 102 and the second terminal 104, after the second terminal 104 presses an intercommunication button in the location sharing session, a real-time recording state is entered after a voice prompt is given. In this case, voice information collected by the second terminal 104 is uploaded in real time, and each member, such as the first terminal 102, in a same location sharing session can receive and play, in real time, the voice information sent by the second terminal 104. That is, the real time communication data is included in the location sharing session, and the real time location data and the real time communication data are simultaneously shared among the terminals in the location sharing session. When the button is released, another voice prompt is given, which indicates that intercommunication recording performed by the second terminal 104 ends. The foregoing is only an example, and is not limited in this application.

Further, during intercommunication recoding of the second terminal 104, there is a green circular light ring around the intercommunication key, which indicates that voice is taken in, and in addition, it is displayed on the second terminal 104 that "I'm speaking".

Optionally, in this embodiment, the shape size of the button may vary as the recording volume varies, for example, if a circular button is used, the circle varies in diameter as the recording volume varies.

S2: The first terminal sends voice information to the second terminal, so that the second terminal receives and plays the voice information sent by the first terminal.

For example, the first terminal 102 sends voice information to the second terminal 104, and the second terminal 104 plays the sent voice information after receiving the voice information.

According to the embodiments provided by this application, members in a same location sharing session can acquire dynamic location information of each other in real time, and at the same time when the dynamically changed location information of the members are shared in real time, the members joining the session can perform voice intercommunication in real time. In this way, the location information or other required information can be accurately and rapidly acquired in such a voice intercommunication manner.

Optionally, when the first terminal receives and plays the voice information sent by the second terminal, the method further includes the following step(s).

S1: Identifying on the first terminal that the voice information comes from the second terminal.

Optionally, in this embodiment, the first terminal 102 may perform voice information transmission with multiple terminals at the same time, but the present disclosure is not limited thereto. For example, after the first terminal 102 receives the voice information from the second terminal 104, it is identified on the first terminal 102 that the received voice information comes from the second terminal 104.

For example, if the location sharing session includes the first terminal 102, the second terminal 104, and the third terminal, it may be displayed, on the location display area of the first terminal 102, that the first terminal is having conversations with multiple terminals in real time; when the second terminal 104 sends voice information to the first terminal 102, a member (for example, the second terminal 104) who is speaking may be displayed on the first terminal 102, for example, there is a green light ring around a profile picture of the member (for example, the second terminal 104) who is speaking in a member list, so as to indicate that the member is in an intercommunication state, and in addition, text that "XX (a name of the member) is speaking" is displayed. The foregoing is only an example, and is not limited in this application.

Optionally, after the first terminal sends the voice information to the second terminal, the method further includes the following step(s).

S1: If the first terminal fails in sending the voice information to the second terminal, a failure is identified on the first terminal.

Optionally, in this embodiment, if members in the same location sharing session send the voice information at the same time, it may be determined that the voice information is sent unsuccessfully.

For example, if the location sharing session includes the first terminal 102, the second terminal 104, and the third terminal (not shown), it may be displayed on the location display area of the first terminal 102 that the first terminal 102 is having conversations with multiple terminals in real time. When the first terminal 102 fails in sending the voice information to the second terminal 104, for example, when there is another member (for example, the third terminal) is having a conversation with the second terminal 104, it is displayed with red font on a corresponding position on the first terminal 102 that "XX (the user name of the third terminal) is speaking", and there is no green light ring around the button of the first terminal 102 and a noise is emitted, which indicates that microphone grabbing fails.

According to the embodiments provided by this application, a source of voice information acquired by a first terminal can be identified, and a failure in receiving the voice information by the first terminal can also be identified, so as to prompt the user to re-record the voice.

FIGS. 11(*a*)-(*d*) illustrates an exemplary user scenario and related process. As shown in FIG. 11(*a*) (similar to FIG. 4), a user (e.g., a first terminal) may share with other users (e.g., a second terminal and a third terminal) with both static location information and dynamic location information in real-time in a form of a map-style information display.

When the users share the location information, the location information sharing interface also is integrated with voice communication facility. FIG. 11(*a*) shows the user pressing the microphone button to initiate a voice communication while in the location sharing session with other users.

As shown in FIG. 11(*b*), after the user pressed the voice starting button, the user may be prompted by a voice prompt to indicate it is ready for record the voice of the user and to transmit the recorded voice to other users, either directly or through a server. FIG. 11(b) shows at the bottom an extended status pane indicating a highlighted frame around a user's icon to indicate that the highlighted user is making the voice communication. The extended status pane may be shown when a downward arrow is selected, and may be hidden when an upward arrow is selected.

Figure 11A:
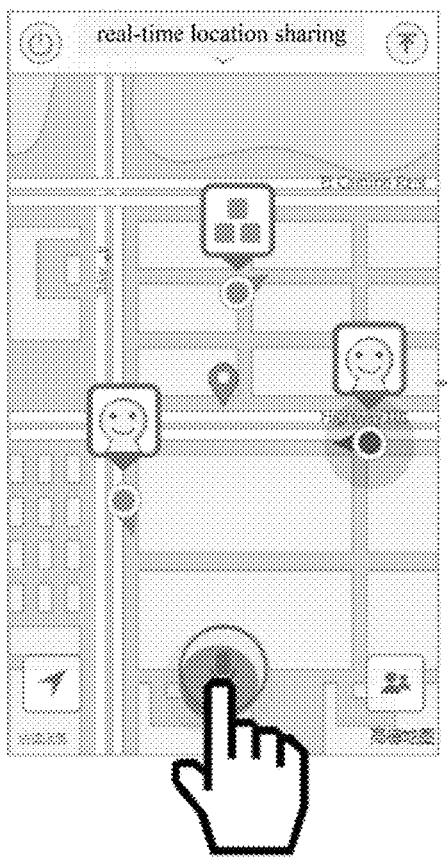
FIGS. 11(a)-(d) illustrate an exemplary user scenario and related processes.
Figure 11A:
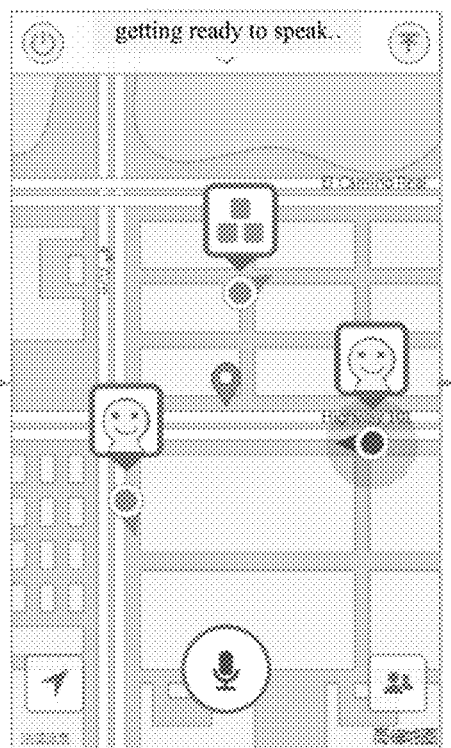
Figure 11B:
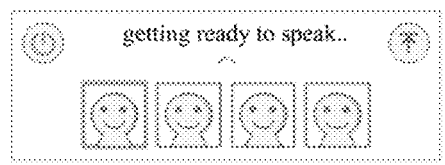
Figure 11C:
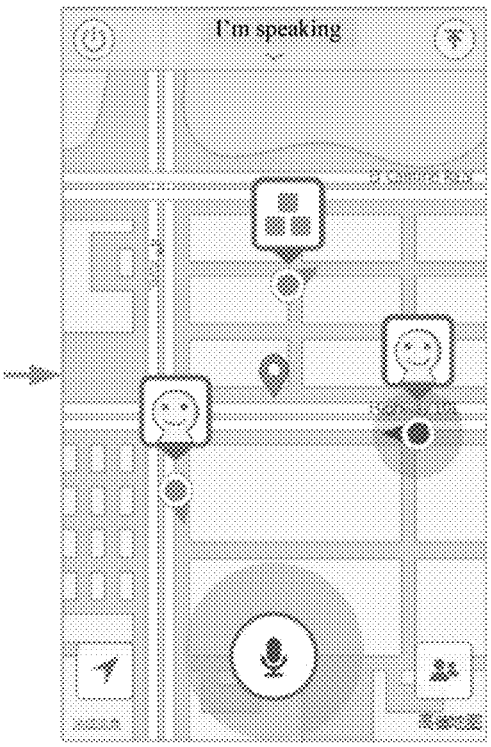
Figure 11C:
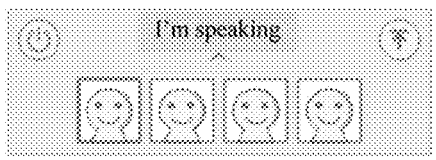

The user may keep the button pressed while talking and, as shown in FIG. 11(c), a green light circle may appear on the microphone button to indicate the system is busy with recording the voice data. The radius of the circle may change according to the volume of the recorded voice. In certain embodiments, only one user can speak at one time. After finishing speaking, the user releases the button, and the record voice data is then transmitted to all other users.

Figure 11D:
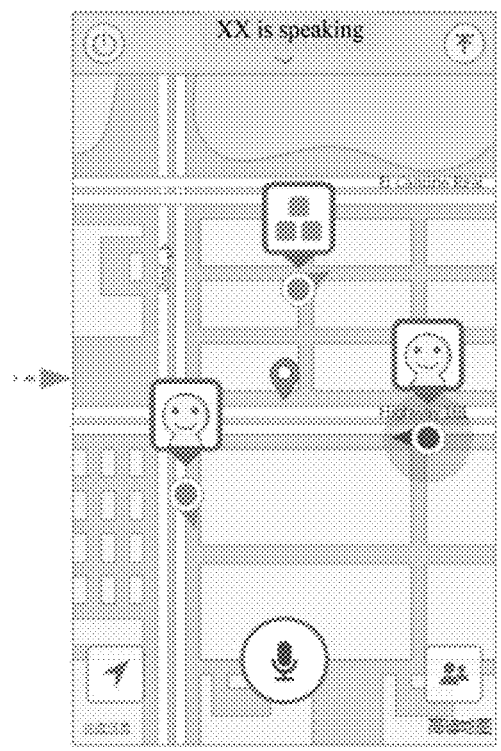

On the user's terminal display screen, as shown in FIG. 11(c), when the user is speaking, there is a prompt on the top of the screen to read "I'm speaking." While other users, i.e., users other than the speaking user, may see the prompt as "XX is speaking", as shown in FIG. 11(d). And a green frame highlight may appear on the speaking user's icon. Further, when only one user can speak at one time, only the user obtaining the microphone may see its microphone button highlighted and the prompt "I'm speaking", while other users (even trying to press the microphone button) will not see the microphone button highlighted and the prompt "XX is speaking."

It should be noted that, for the methods according to the embodiments, for purposes of simplicity of explanation, the methods are described as a combination of a series of actions, but it should be clear to persons skilled in the art that the present disclosure is not limited by the order of the actions, as some steps can, in accordance with the present disclosure, be performed in other orders or concurrently. Next, persons skilled in the art should also know that, the embodiments described in the specification all fall within exemplary embodiments, and the related actions and modules are not necessarily required by the present disclosure.

Through the above description of the implementation, it is clear to persons skilled in the art that the present disclosure may be accomplished through software plus a necessary hardware platform, or completely through hardware, but in many cases the former is preferred implementation. Based on this, the technical solution of the present disclosure or the part that makes contributions to the prior art can be embodied in the form of a software product. The computer software product may be stored in a storage medium such as a ROM/RAM, a magnetic disk or an optical disc, and contain several instructions to instruct computer equipment (for example, a personal computer, a server, or network equipment) to perform the method described in the embodiments of the present disclosure or in some parts of the embodiments.

Embodiment 2

Figure 8:
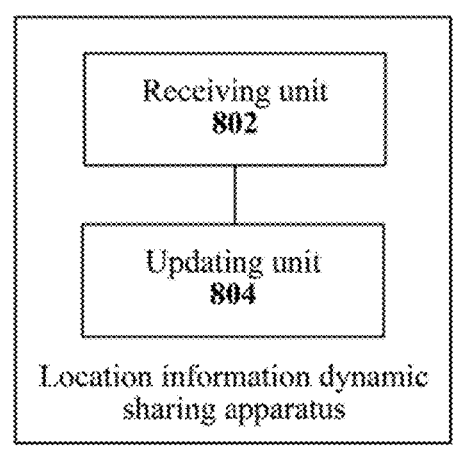
FIG. 8 is a schematic diagram of an optional location information sharing apparatus according to an embodiment of the present disclosure.

An embodiment of the present disclosure further provides a location information sharing apparatus, as shown in FIG. 8, the apparatus includes a receiving unit 802 and an updating unit 804, etc.

The receiving unit 802 is configured to receive current location information of a second terminal.

Optionally, a first terminal 102 and a second terminal 104 may be members in a same location sharing session, where the session in this embodiment is a connection-oriented communications manner, and many users are allowed to participate in the session to simultaneously communicate with each other. Optionally, the current location information in this embodiment may include at least one of the following: the longitude and latitude of a current location, a prominent building around the current location, and a moving direction showing a change of a terminal location.

Optionally, a current location of the second terminal is displayed on the first terminal 102 by using a marker on a map. Optionally, the first terminal 102 and the second terminal 104 in this embodiment may be, but are not limited to, mobile phones or tablet computers, which are only examples.

Optionally, the foregoing scene may be applied to an instant messaging process, so that members who are communicating with each other can acquire location information of each other in real time. For example, when a location sharing session includes two member terminals: the first terminal 102 and the second terminal 104, the first terminal 102 receives current location information sent by the second terminal 104. The foregoing is only an example, and is not limited in this application.

Optionally, a condition of sending the current location information by the second terminal 104 includes at least one of the following: 1) the second terminal 104 sends updated location information to the first terminal after detecting a location change of the second terminal 104; and 2) the second terminal 104 actively sends current location information of the second terminal 104 every pre-determined period. Optionally, the current location information displayed on a location display area of the first terminal 102 may include at least one of the following: picture information and text information.

For example, when the second terminal 104 detects a change in location information of the second terminal 104, for example, as shown in FIG. 5, when the second terminal 104 moves from a location A to a location B, location information of the location B is sent to the first terminal 102, where the sent location information includes: a moving direction from the location A to the location B, the longitude and latitude of the location B, and a prominent building around the location B. For ease of understanding, FIG. 5 only shows a relative location change of the second terminal 104, while FIG. 5 may further include map information, window information, button information, and the like that are shown in FIG. 4, which are not limited in this application.

The updating unit 804 is configured to update, on a location display area of the first terminal, a previous location of the second terminal that is marked by using previous location information of the second terminal to a current location of the second terminal that is marked by using the current location information.

Optionally, the location display area may be a part or all of a display screen of the first terminal, and the previous location or the current location of the second terminal may be displayed on the location display area by using an application program running on the first terminal. FIG. 4 shows an optional example in which location information (for example, the previous location or the current location of the second terminal) is displayed on a location display area, and in FIG. 4, the location information is marked on map information. In addition to the location information and the map information, corresponding window information, button information, and the like may further be displayed on the location display area, which are not limited in this embodiment.

Optionally, the previous location information in this embodiment is received by the first terminal before receiving the current location information.

Optionally, the location information displayed on the location display area of the first terminal 102 may include at least one of the following: location information of all members in a same location sharing session, and location information of members who meet pre-determined requirements in a same location sharing session, where the members who meet pre-determined requirements include a member who joins the session first and a member whose communication distance is less than a pre-determined threshold.

For example, if the previous location of the second terminal that is received by the first terminal 102 previously is a location A, and the current location of the second terminal 104 that is received by the first terminal 102 afterwards is a location B, the location A for identifying the location of the second terminal and displayed on the location display area of the first terminal 102 is updated to the location B.

Optionally, the location information transmitted in this embodiment may be, as shown in FIG. 1, processed by a server 106 and then continuously transmitted, or may also be directly transmitted from a terminal to another terminal to achieve information transmission. For example, as shown in FIG. 1, the location information of the second terminal 104 may be first sent to the server 106, and the server 106 processes the location information and then sends processed location information to the first terminal 102; or the second terminal 104 may also directly transmit the location information to the first terminal 102.

According to the embodiments of this application, a first terminal receives current location information of a second terminal, and updates the current location information of the second terminal on a corresponding location display area of the first terminal, so that the first terminal can share dynamic location information of the second terminal in real time, and current location changes and moving directions of all members in a location sharing session can be acquired. In this way, dynamic location information of many users can be shared, thereby improving user experience according to user requirements.

Figure 9:
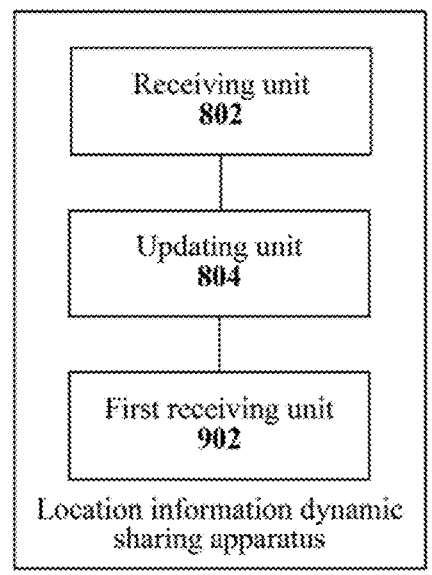
FIG. 9 is another schematic diagram of an optional location information sharing apparatus according to an embodiment of the present disclosure.

Optionally, as shown in FIG. 9, the apparatus in this embodiment further includes a first sending unit 902, which is configured to send current location information of the first terminal to the second terminal, so that the second terminal updates, on a location display area of the second terminal, a previous location of the first terminal that is marked by using previous location information of the first terminal to a current location of the first terminal that is marked by using the current location information of the first terminal, where the previous location information of the first terminal is received by the second terminal previously.

For example, the first terminal 102 may send current location information of the first terminal 102 to a server 106, and then the server 106 transmits the current location information to the second terminal 104. For example, if the first terminal 102 moves from a location C to a location D, the location C for identifying the location of the first terminal 102 is updated to the location D on the location display area of the second terminal 104.

According to the embodiments provided by this application, current location information of a first terminal is sent to a second terminal, so that current location information of the first terminal on the location display area of the second terminal is updated, and dynamically changed location information of members in a location sharing session can be shared.

Optionally, the apparatus in this embodiment further includes: (1) an initiation unit, configured to initiate a location sharing session before the first terminal receives the current location information of the second terminal; (2) a waiting unit, configured to wait for the second terminal to join the location sharing session; (3) a first receiving unit, configured to receive the previous location information of the second terminal after the second terminal joins the location sharing session; and (4) a first displaying unit, configured to display, on the location display area of the first terminal, the previous location of the second terminal that is marked by using the previous location information of the second terminal.

Optionally, the foregoing scene is applied after the first terminal 102 initiates a location sharing session, and one or more terminals may be invited to participate in the session. Optionally, a method for displaying multiple terminals on the location display area of the first terminal 102 includes at least one of the following: displaying locations of all terminals in a same window; displaying the location of the first terminal 102 and a location of any invited terminal in a same window; displaying locations of terminals first participating in the session in a same window; and displaying locations of terminals whose communication distances are each less than a pre-determined threshold in a same window, where the communication distance being less than the pre-determined threshold may be, but is not limited to, the terminals being in a same cell or a same city. The foregoing window may be shown in FIG. 4, and optionally, in foregoing different display manners, scaling of the map shown in the window is also different.

For example, the first terminal 102 actively initiates a location sharing session, invites the second terminal 104 to join the session, receives the previous location information of the second terminal 104 after the second terminal 104 joins the session, and marks the previous location of the second terminal 104 on the location display area of the first terminal 102 according to the previous location information.

According to the embodiment provided by this application, a first terminal actively initiates a location sharing session, and receives and displays previous location information of a second terminal joining the session, so that terminals included in a same location sharing session can share dynamic location information, and acquire locations of all members in the session in real time, thereby improving user experience of the communicating members.

Optionally, the apparatus in this embodiment further includes a second displaying unit and a third displaying unit.

The second displaying unit is configured to display the current location or the previous location of the first terminal on the location display area of the first terminal when the previous location of the second terminal that is marked by using the previous location information of the second terminal is displayed on the location display area of the first terminal.

Optionally, the location display area may be a part or all of a display screen of the first terminal, and the previous location or the current location of the second terminal may be displayed on the location display area by using an application program running on the first terminal. FIG. 4 shows an optional example in which location information (for example, the previous location or the current location of the second terminal) is displayed on a location display area, and in FIG. 4, the location information is marked on map information. In this embodiment, besides the location information and the map information, corresponding window information, button information, and the like may further be displayed on the location display area, which are not limited in this embodiment.

For example, when a previous location A of the second terminal that is marked by using the previous location information of the second terminal 104 is displayed on the location display area of the first terminal 102, the current location or the previous location of the first terminal 102 may be further displayed on the location display area of the first terminal 102. For example, if the previous location of the first terminal 102 is C and the current location thereof is D, the previous location C or the current location D of the first terminal 102 is displayed on the location display area of the first terminal 102.

The third displaying unit is configured to display the current location or the previous location of the first terminal and a current location or a previous location of a third terminal on another location display area of the first terminal different from the location display area of the first terminal, where the third terminal joins, in advance of the second terminal, the location sharing session initiated by the first terminal.

Optionally, in this embodiment, the location display area of the first terminal 102 may include, but is not limited to, multiple windows.

Optionally, the first terminal 102, the second terminal 104, and the third terminal in this embodiment may be members in a same location sharing session.

Optionally, a method for displaying the first terminal 102, the second terminal 104, and the third terminal on the location display area of the first terminal 102 includes, but is not limited to, at least one of the following: displaying them in a same window; displaying the first terminal 102 and any invited terminal in a same window; displaying, in a same window, the first terminal and the third terminal that first participate in the session; and displaying, in a same window, the first terminal and the third terminal that are in the same city.

For example, as shown in FIG. 6, when the first terminal 102 initiates a location sharing session, the first terminal 102 first invites the third terminal, and then invites the second terminal 104 to join the location sharing session. As shown in FIG. 6(a) and FIG. 6(b), when a previous location A of the second terminal 104 that is marked by using the previous location information of the second terminal 104 is displayed on the location display area of the first terminal 102, a previous location C or a current location D of the first terminal 102 and a previous location E or a current location F of the third terminal are displayed on another location display area of the first terminal 102 different from the location display area of the first terminal 102, such as in a window different from the window in which the second terminal 104 is displayed. The first terminal and the third terminal first participate in the session, and accordingly they are displayed in the same window, while the second terminal may be displayed in another window. For ease of understanding, FIG. 6 may further include map information, window information, button information, and the like that are shown in FIG. 4, which are not limited in this application.

According to the embodiments provided by this application, a first terminal and a third terminal that first participates in a session are displayed on a position different from a location display area of the second terminal, so that members who participate in the session afterwards does not affect normal communication and location information sharing between members who participate in the session previously.

Optionally, the apparatus in this embodiment further includes: (1) a joining unit, configured to join, before the first terminal receives the current location information of the second terminal, a location sharing session initiated by the second terminal, where, optionally, the foregoing scene is applied after the second terminal 104 actively initiates a location sharing session, and the first terminal 102 is invited to join the location sharing session, that is, the first terminal 102 joins the session as an invited session member; (2) a second receiving unit, configured to receive the previous location information of the second terminal after the first terminal joins the location sharing session; and (3) a fourth displaying unit, configured to display, on the location display area of the first terminal, the previous location of the second terminal that is marked by using the previous location information of the second terminal.

Optionally, in this embodiment, the location display area may be a part or all of a display screen of the first terminal, and the previous location or the current location of the second terminal may be displayed on the location display area by using an application program running on the first terminal. FIG. 4 shows an optional example in which location information (for example, the previous location or the current location of the second terminal) is displayed on a location display area, and in FIG. 4, the location information is marked on map information. In this embodiment, besides the location information and the map information, corresponding window information, button information, and the like may further be displayed on the location display area, which are not limited in this embodiment.

Optionally, the first terminal 102 accepts the invitation to participate in the location sharing session initiated by the second terminal 104. Optionally, the location display area may be a part or all of a display screen of the first terminal, and the previous location or the current location of the second terminal may be displayed on the location display area by using an application program running on the first terminal. FIG. 4 shows an optional example in which location information (for example, the previous location or the current location of the second terminal) is displayed on a location display area, and in FIG. 4, the location information is marked on map information. In this embodiment, besides the location information and the map information, corresponding window information, button information, and the like may further be displayed on the location display area, which are not limited in this embodiment.

For example, after joining the location sharing session initiated by the second terminal 104, the first terminal 102 receives the previous location information of the second terminal 104, and displays, on the location display area of the first terminal 102, the previous location of the second terminal 104 that is marked by using the previous location information of the second terminal 104.

Optionally, the apparatus in this embodiment further includes a fifth displaying unit configured to display the current location or the previous location of the first terminal on the location display area of the first terminal when the previous location of the second terminal that is marked by using the previous location information of the second terminal is displayed on the location display area of the first terminal.

Optionally, not only the previous location of the second terminal 104 can be displayed on the location display area of the first terminal 102, the current location or the previous location of the first terminal 102 can also be displayed thereon. For example, if the previous location of the first terminal 102 is C and the current location thereof is D, the previous location C or the current location D of the first terminal 102 is displayed on the location display area of the first terminal 102.

Further, as shown in FIG. 7, all terminals participating in the session may be displayed in a separated manner. That is, location information of all members who participate in the location sharing session is displayed on the location display area of the first terminal 102, such as the previous location of the second terminal 104, and the previous location or the current location of the first terminal 102. For ease of understanding, FIG. 7 may further include map information, window information, button information, and the like that are shown in FIG. 4, which are not limited in this application.

According to the embodiments provided by this application, a current location or a previous location of a first terminal is displayed on a location display area of the first terminal, so that a second terminal and the first terminal are displayed in a same window at the same time, and dynamic location information of members in a location sharing session can be shared.

Optionally, the apparatus in this embodiment further includes: a receiving and playing unit, and a second sending unit, etc.

The receiving and playing unit is configured to receive and play voice information sent by the second terminal.

Optionally, the first terminal 102 and the second terminal 104 in this embodiment may be members in a same location sharing session.

Optionally, at the same time when a member (for example, the first terminal 102) in a same location sharing session implements location sharing, the member may further receive and play voice information sent by another member (for example, the second terminal 104).

Optionally, the location sharing session includes a voice collection button, for example, a real-time recording state is entered after a user presses the voice collection button.

For example, when a location sharing session includes the first terminal 102 and the second terminal 104, after the second terminal 104 presses an intercommunication button in the location sharing session, a real-time recording state is entered after a voice prompt is given. In this case, voice information collected by the second terminal 104 is uploaded in real time, and each member, such as the first terminal 102, in a same location sharing session can receive and play, in real time, the voice information sent by the second terminal 104. When the button is released, another voice prompt is given, which indicates that intercommunication recording performed by the second terminal 104 ends. The foregoing is only an example, and is not limited in this application.

Further, in this embodiment, during intercommunication recoding of the second terminal 104, there is a green circular light ring around the intercommunication key, which indicates that voice is taken in, and in addition, it is displayed on the second terminal 104 that "I'm speaking".

Optionally, in this embodiment, the shape size of the button may vary as the recording volume varies, for example, if a circular button is used, the circle varies in diameter as the recording volume varies.

The second sending unit is configured to send voice information to the second terminal, so that the second terminal receives and plays the voice information sent by the first terminal.

For example, the first terminal 102 sends voice information to the second terminal 104, and the second terminal 104 plays the sent voice information after receiving the voice information.

According to the embodiment provided by this application, members in a same location sharing session can acquire dynamic location information of each other in real time, and at the same time when the dynamically changed location information of the members are shared in real time, the members joining the session can perform voice intercommunication in real time; in this way, the location information or other required information can be accurately and rapidly acquired in such a voice intercommunication manner.

Optionally, the apparatus in this embodiment further includes a first identifying unit configured to: identify, when the first terminal receives and plays the voice information sent by the second terminal, on the first terminal that the voice information comes from the second terminal.

Optionally, the first terminal 102 may perform voice information transmission with multiple terminals at the same time, but the present disclosure is not limited thereto. For example, after the first terminal 102 receives the voice information from the second terminal 104, it is identified on the first terminal 102 that the received voice information comes from the second terminal 104.

For example, if the location sharing session includes the first terminal 102, the second terminal 104, and the third terminal, it may be displayed, on the location display area of the first terminal 102, that the first terminal is having conversations with multiple terminals in real time; when the second terminal 104 sends voice information to the first terminal 102, a member (for example, the second terminal 104) who is speaking may be displayed on the first terminal 102, for example, there is a green light ring around a profile picture of the member (for example, the second terminal 104) who is speaking in a member list, so as to indicate that the member is in an intercommunication state, and in addition, text that "XX (a name of the member) is speaking" is displayed. The foregoing is only an example, and is not limited in this application.

Optionally, the apparatus in this embodiment further includes a second identifying unit configured to identify a failure on the first terminal when the first terminal fails in sending the voice information to the second terminal.

Optionally, if members in the same location sharing session send the voice information at the same time, it may be determined that the voice information is sent unsuccessfully.

For example, if the location sharing session includes the first terminal 102, the second terminal 104, and the third terminal (not shown), it may be displayed on the location display area of the first terminal 102 that the first terminal 102 is having conversations with multiple terminals in real time; when the first terminal 102 fails in sending the voice information to the second terminal 104, for example, when there is another member (for example, the third terminal) is having a conversation with the second terminal 104, it is displayed with red font on a corresponding position on the first terminal 102 that "XX (the user name of the third terminal) is speaking", and there is no green light ring around the button of the first terminal 102 and a noise is emitted, which indicates that microphone grabbing fails.

Figure 10:
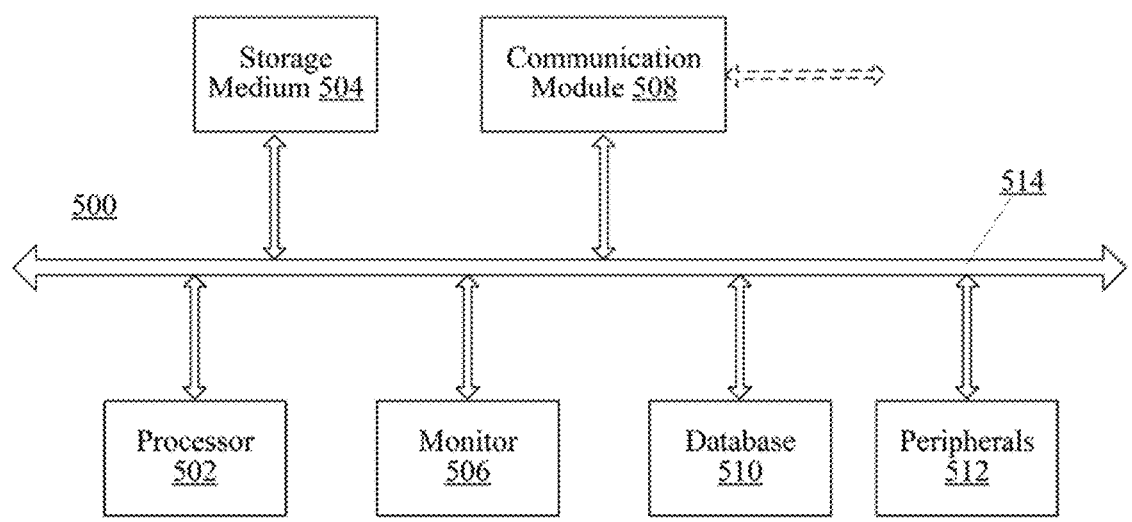
FIG. 10 illustrates an exemplary computing system.

The apparatus, the server, the terminal, and/or the various modules/units may be implemented in one or more computing systems. FIG. 10 illustrates an exemplary computing system.

As shown in FIG. 10, computing system 500 may include a processor 502, a storage medium 504, a monitor 506, a communication module 508, a database 510, peripherals 512, and one or more bus 514 to couple the devices together. Certain devices may be omitted and other devices may be included.

The processor 502 can include any appropriate processor or processors. Further, the processor 502 can include multiple cores for multi-thread or parallel processing. The storage medium 504 may include memory modules, e.g., Read-Only Memory (ROM), Random Access Memory (RAM), and flash memory modules, and mass storages, e.g., CD-ROM, U-disk, removable hard disk, etc. The storage medium 504 may store computer programs for implementing various processes (e.g., running a messaging application, sharing a real-time location, facilitating online voice communication, etc.), when executed by the processor 502.

The monitor 506 may include display devices for displaying contents in the computing system 500, e.g. displaying a user interface for real-time location sharing and voice communication. The peripherals 512 may include I/O devices, e.g., speaker, microphone, touchscreen, keyboard and mouse for inputting information by a user. The peripherals may also include certain sensors, such as GPS (global positioning system) sensors, gravity sensors, gyroscope, acceleration sensors, and other types of sensors.

Further, the communication module 508 may include network devices for establishing connections through a communication network such as Internet or other types of computer networks or telecommunication networks, either wired or wireless. The database 510 may include one or more databases for storing certain data and for performing certain operations on the stored data.

In operation, the first terminal 102, the second terminal 104, and the server 106 may be implemented by the computing system 500 for real-time location sharing and voice communication.

According to the embodiment provided by this application, a source of voice information acquired by a first terminal can be identified, and a failure in receiving the voice information by the first terminal can also be identified, so as to prompt the user to re-record the voice. The sequence numbers of the preceding embodiments of the present disclosure are merely for description purpose but do not indicate the preference of the embodiments.

In the embodiments of the present disclosure, description for the embodiments has its own emphasis, and a part without being described in detail in a certain embodiment can be obtained with reference to relevant description in other embodiments.

In the several embodiments provided by the present application, it should be noted that, the disclosed client can be implemented in other manners. The apparatus embodiments described above are merely illustrative, and the modules or units of the apparatus are divided from the perspective of logical functions only and may be divided in a different way in practical application. For example, multiple units or components may be combined or integrated into another system, or some features can be omissible or not executed. Besides, the coupling, direct coupling or communication connection illustrated or discussed herein may be implemented through indirect coupling or communication connection between interfaces, units, or modules, and may be electronic or in other forms.

Units described as separate components may be or may not be physically separated. Components shown as units may be or may not be physical units, that is, may be located in one place, or may also be distributed to a plurality of network units. Some or all of the units may be selected to achieve the objective of the solution of the embodiments according to actual requirements.

In addition, the functional modules in the embodiments of the present disclosure may be integrated into one processing unit, or each of the modules may exist alone physically, or two or more modules may be integrated into one unit. The integrated unit may be implemented in the form of hardware, or may be implemented in the form of a software functional unit.

The functional modules in the embodiments may be located in one terminal or network node, or may be distributed on multiple terminals or network nodes. Based on this, the technical solution of the present disclosure, the part that makes contributions to the prior art, or all or a part of the technical solution can be embodied in the form of a software product. The computer software product may be stored in a storage medium, and contain several instructions to instruct computer equipment (for example, a personal computer, a server, or network equipment) to perform all or some steps of the method described in the embodiments of the present disclosure. The above storage medium includes any medium that can store program code, such as a USB flash disk, a read-only memory (ROM), a random access memory (RAM), a removable hard disk, a magnetic disk, or an optical disc.

Only exemplary embodiments of the present disclosure are described above. It should be noted that, improvements and modifications may be made by persons of ordinary skill in the art without departing from the principles of the present disclosure, and the improvements and modifications shall be construed as falling within the protection scope of the present disclosure.

What is claimed is:

1. A location information sharing method, comprising:
    initiating, by a first terminal, a location sharing session;
    waiting, by the first terminal, for a second terminal to join the location sharing session;
    receiving, by the first terminal, previous location information of the second terminal after the second terminal joins the location sharing session, and displaying, on a location display area of the first terminal, the previous location of the second terminal that is marked by using the previous location information of the second terminal;
    receiving, by a first terminal, current location information of a second terminal;
    updating, by the first terminal and on the location display area of the first terminal, the previous location of the second terminal that is marked by using previous location information of the second terminal to a current location of the second terminal that is marked by using the current location information, wherein the previous location information is received by the first terminal before receiving the current location information; and
    displaying, by the first terminal, on the location display area of the first terminal a voice communication interface for providing voice communication simultaneously within the location sharing session, wherein the voice communication is transmitted after the location sharing session is started.

2. The method according to claim 1, further comprising:
    sending, by the first terminal, current location information of the first terminal to the second terminal, so that the second terminal updates, on a location display area of the second terminal, a previous location of the first terminal that is marked by using previous location information of the first terminal to a current location of the first terminal that is marked by using the current location information of the first terminal, wherein the previous location information of the first terminal is received by the second terminal previously.

3. The method according to claim 2, wherein when the previous location of the second terminal that is marked by using the previous location information of the second terminal is displayed on the location display area of the first terminal, the method further comprises:
  displaying the current location or the previous location of the first terminal on the location display area of the first terminal; or
  displaying the current location or the previous location of the first terminal and a current location or a previous location of a third terminal on another location display area of the first terminal different from the location display area of the first terminal, wherein the third terminal joins, in advance of the second terminal, the location sharing session initiated by the first terminal.

4. The method according to claim 1, before the receiving, by a first terminal, current location information of a second terminal, further comprising:
  joining, by the first terminal, a location sharing session initiated by the second terminal; and
  receiving, by the first terminal, the previous location information of the second terminal after joining the location sharing session, and displaying, on the location display area of the first terminal, the previous location of the second terminal that is marked by using the previous location information of the second terminal.

5. The method according to claim 4, wherein when the previous location of the second terminal that is marked by using the previous location information of the second terminal is displayed on the location display area of the first terminal, the method further comprises:
  displaying the current location or the previous location of the first terminal on the location display area of the first terminal.

6. The method according to claim 1, further comprising at least one of:
  receiving and playing, by the first terminal, voice information sent by the second terminal;
  sending, by the first terminal, voice information to the second terminal, so that the second terminal receives and plays the voice information sent by the first terminal.

7. The method according to claim 6, before the receiving and playing, by the first terminal, voice information sent by the second terminal, further comprising:
  identifying on the first terminal that the voice information comes from the second terminal.

8. A location information sharing method, comprising:
  initiating, by a first terminal, a location sharing session;
  waiting, by the first terminal, for a second terminal to join the location sharing session;
  receiving, by the first terminal, previous location information of the second terminal after the second terminal joins the location sharing session, and displaying, on a location display area of the first terminal, the previous location of the second terminal that is marked by using the previous location information of the second terminal;
  receiving, by a first terminal, current location information of a second terminal;
  updating, by the first terminal and on the location display area of the first terminal, the previous location of the second terminal that is marked by using previous location information of the second terminal to a current location of the second terminal that is marked by using the current location information, wherein the previous location information is received by the first terminal before receiving the current location information; and
  displaying, by the first terminal, on the location display area of the first terminal a voice communication interface for providing voice communication simultaneously within the location sharing session;
  wherein the method further comprises at least one of:
  receiving and playing, by the first terminal, voice information sent by the second terminal;
  sending, by the first terminal, voice information to the second terminal, so that the second terminal receives and plays the voice information sent by the first terminal
  wherein before the sending, by the first terminal, voice information to the second terminal, the method further comprises:
  identifying a failure on the first terminal when the first terminal fails in sending the voice information to the second terminal.

9. A location information sharing apparatus, comprising:
  one or more processors;
  memory; and
  one or more units stored in the memory and to be executed by the one or more processors, the one or more units comprising:
  a receiving unit, configured to receive current location information of a second terminal;
  an updating unit, configured to update, on a location display area of the first terminal, a previous location of the second terminal that is marked by using previous location information of the second terminal to a current location of the second terminal that is marked by using the current location information, wherein the previous location information is received by the first terminal before receiving the current location information;
  an initiation unit, configured to initiate a location sharing session before the first terminal receives the current location information of the second terminal;
  a waiting unit, configured to wait for the second terminal to join the location sharing session;
  a first receiving unit, configured to receive the previous location information of the second terminal after the second terminal joins the location sharing session; and
  a first displaying unit, configured to display, on the location display area of the first terminal, the previous location of the second terminal that is marked by using the previous location information of the second terminal,
  wherein the first terminal displays on the location display area of the first terminal a voice communication interface for providing voice communication simultaneously within the location sharing session;
  wherein the one or more units further comprises:
  a receiving and playing unit, configured to receive and play voice information sent by the second terminal;
  a second sending unit, configured to send voice information to the second terminal, so that the second terminal receives and plays the voice information sent by the first terminal; and a second identifying unit, configured to identify a failure on the first terminal when the first terminal fails in sending the voice information to the second terminal.

10. The apparatus according to claim 9, further comprising:
a first sending unit, configured to send current location information of the first terminal to the second terminal, so that the second terminal updates, on a location display area of the second terminal, a previous location of the first terminal that is marked by using previous location information of the first terminal to a current location of the first terminal that is marked by using the current location information of the first terminal, wherein the previous location information of the first terminal is received by the second terminal previously.

11. The apparatus according to claim 10, further comprising:
a second displaying unit, configured to display the current location or the previous location of the first terminal on the location display area of the first terminal when the previous location of the second terminal that is marked by using the previous location information of the second terminal is displayed on the location display area of the first terminal; or
a third displaying unit, configured to display the current location or the previous location of the first terminal and a current location or a previous location of a third terminal on another location display area of the first terminal different from the location display area of the first terminal, wherein the third terminal joins, in advance of the second terminal, the location sharing session initiated by the first terminal.

12. The apparatus according to claim 9, further comprising:
a joining unit, configured to join, before the first terminal receives the current location information of the second terminal, a location sharing session initiated by the second terminal;
a second receiving unit, configured to receive the previous location information of the second terminal after the first terminal joins the location sharing session; and
a fourth displaying unit, configured to display, on the location display area of the first terminal, the previous location of the second terminal that is marked by using the previous location information of the second terminal.

13. The apparatus according to claim 12, further comprising:
a fifth displaying unit, configured to display the current location or the previous location of the first terminal on the location display area of the first terminal when the previous location of the second terminal that is marked by using the previous location information of the second terminal is displayed on the location display area of the first terminal.

14. The apparatus according to claim 9, further comprising:

a first identifying unit, configured to: identify, when the first terminal receives and plays the voice information sent by the second terminal, on the first terminal that the voice information comes from the second terminal.

15. The method according to claim 8, further comprising:
sending, by the first terminal, current location information of the first terminal to the second terminal, so that the second terminal updates, on a location display area of the second terminal, a previous location of the first terminal that is marked by using previous location information of the first terminal to a current location of the first terminal that is marked by using the current location information of the first terminal, wherein the previous location information of the first terminal is received by the second terminal previously.

16. The method according to claim 8, before the receiving, by a first terminal, current location information of a second terminal, further comprising:
joining, by the first terminal, a location sharing session initiated by the second terminal; and
receiving, by the first terminal, the previous location information of the second terminal after joining the location sharing session, and displaying, on the location display area of the first terminal, the previous location of the second terminal that is marked by using the previous location information of the second terminal.

17. The method according to claim 16, wherein when the previous location of the second terminal that is marked by using the previous location information of the second terminal is displayed on the location display area of the first terminal, the method further comprises:
displaying the current location or the previous location of the first terminal on the location display area of the first terminal.

18. The method according to claim 8, before the receiving and playing, by the first terminal, voice information sent by the second terminal, further comprising:
identifying on the first terminal that the voice information comes from the second terminal.

19. The method according to claim 1, wherein the voice communication interface includes a voice collection button, and the method further comprises:
recording, by the first terminal, voice information after the voice collection button is pressed; and
sending, by the first terminal, the recorded voice information to the second terminal in the location sharing session.

20. The method according to claim 19, wherein:
when the voice collection button is pressed, the first terminal enters a real-time recording state and sends the recorded voice information to the second terminal in real time; and
when the voice collection button is released, the first terminal ends the real-time recording.

* * * * *